United States Patent
Kai

(10) Patent No.: US 12,534,347 B2
(45) Date of Patent: Jan. 27, 2026

(54) VEHICLE CONTROL APPARATUS, CONTROL METHOD, AND NON-TRANSITORY COMPUTER READABLE MEDIUM

(71) Applicant: NEC Corporation, Tokyo (JP)

(72) Inventor: Natsuki Kai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 113 days.

(21) Appl. No.: 18/287,550

(22) PCT Filed: Apr. 30, 2021

(86) PCT No.: PCT/JP2021/017191
§ 371 (c)(1),
(2) Date: Oct. 19, 2023

(87) PCT Pub. No.: WO2022/230172
PCT Pub. Date: Nov. 3, 2022

(65) Prior Publication Data
US 2024/0217792 A1     Jul. 4, 2024

(51) Int. Cl.
*B66F 9/06*     (2006.01)
*B66F 9/075*     (2006.01)
(Continued)

(52) U.S. Cl.
CPC ............ *B66F 9/063* (2013.01); *B66F 9/0755* (2013.01); *G06T 7/50* (2017.01); *G06T 7/60* (2013.01);
(Continued)

(58) Field of Classification Search
CPC .......... B66F 9/063; B66F 9/0755; B66F 9/24; G06T 7/50; G06T 7/60; G06T 7/70;
(Continued)

(56) References Cited

U.S. PATENT DOCUMENTS

2011/0282519 A1* 11/2011 Carlsson ................ E02F 9/205
                                                 701/2
2017/0248948 A1* 8/2017 Otani ................... H04N 23/685
(Continued)

FOREIGN PATENT DOCUMENTS

| JP | H01-241604 A | 9/1989 |
| JP | 2001-129777 A | 5/2001 |

(Continued)

OTHER PUBLICATIONS

JP-7259634-B2 machine translation (Year: 2023).*
(Continued)

*Primary Examiner* — Anne Marie Antonucci
*Assistant Examiner* — Jingli Wang
(74) *Attorney, Agent, or Firm* — Sughrue Mion, PLLC

(57) ABSTRACT

An object is to provide a vehicle control apparatus that can accurately control autonomous driving of a vehicle using images. A vehicle control apparatus (10) according to the present disclosure includes a camera image acquisition unit (11) configured to acquire an image from a camera included in a forklift; an image recognition unit (12) configured to recognize a pallet and an insertion opening provided in the pallet from the acquired image; and a movement control unit (13) configured to determine a direction in which the forklift is present with respect to the insertion opening according to a relative size of the insertion opening relative to a size of the pallet in the image and control movement of the forklift so as to move a fork of the forklift to a position where the fork of the forklift can be inserted into the insertion opening.

11 Claims, 10 Drawing Sheets

(51) Int. Cl.
  *G06T 7/50* (2017.01)
  *G06T 7/60* (2017.01)
  *G06T 7/70* (2017.01)
  *G06V 10/70* (2022.01)
  *G06V 20/56* (2022.01)

(52) U.S. Cl.
  CPC ............... *G06T 7/70* (2017.01); *G06V 10/70* (2022.01); *G06V 20/56* (2022.01); *G06T 2207/20081* (2013.01); *G06T 2207/30252* (2013.01)

(58) Field of Classification Search
  CPC . G06T 2207/20081; G06T 2207/30252; G06T 2207/20084; G06T 7/73; G06V 10/70; G06V 20/56
  See application file for complete search history.

(56) References Cited

U.S. PATENT DOCUMENTS

| 2018/0330526 A1* | 11/2018 | Corcoran | G06V 20/58 |
| 2019/0111842 A1* | 4/2019 | Batur | G06V 20/586 |
| 2019/0236789 A1* | 8/2019 | Xu | G06T 7/11 |
| 2020/0172101 A1* | 6/2020 | Shimizu | B60W 30/16 |
| 2021/0188261 A1* | 6/2021 | Song | B60W 40/105 |
| 2022/0411246 A1* | 12/2022 | Kubotani | B66F 17/003 |
| 2023/0373475 A1* | 11/2023 | Fujita | G08G 1/167 |

FOREIGN PATENT DOCUMENTS

| JP | 2017-019596 A | | 1/2017 |
| JP | 2019156641 A | * | 9/2019 |
| JP | 2020-040769 A | | 3/2020 |
| JP | 2021-028796 A | | 2/2021 |
| JP | 7259634 B2 | * | 4/2023 |

OTHER PUBLICATIONS

JP-2019156641-A machine translation (Year: 2019).*
International Search Report for PCT Application No. PCT/JP2021/017191, mailed on Jul. 27, 2021.

* cited by examiner

| TRAVEL CONTROL LEVER | | STEERING | |
|---|---|---|---|
| +450 | MOVE FORWARD | +8,800 | TURN RIGHT |
| 0 | NEUTRAL | 0 | NEUTRAL |
| -400 | MOVE BACKWARD | -8,800 | TURN LEFT |

VEHICLE CONTROL APPARATUS, CONTROL METHOD, AND NON-TRANSITORY COMPUTER READABLE MEDIUM

This application is a National Stage Entry of PCT/JP2021/017191 filed on Apr. 30, 2021, the contents of all of which are incorporated herein by reference, in their entirety.

TECHNICAL FIELD

The present disclosure relates to a vehicle control apparatus, a control method, a program, and a non-transitory computer readable medium storing the program.

BACKGROUND ART

In recent years, for the purpose of addressing a labor shortage in the field of logistics, a technique to operate forklifts autonomously (that is, without requiring human intervention), rather than human operating them has been studied. When an autonomously operating forklift is used in the field of logistics, it is necessary to make the forklifts move in a way that precisely inserts forks of the forklift into fork pockets provided in pallets.

Patent Literature 1 discloses a configuration of an unmanned forklift that uses a television camera installed at a tip of a fork to three-dimensionally capture a position of a pallet and generate an approach trajectory from the current position of the forklift to the position of the pallet. The unmanned forklift uses the television camera to capture images of the pallet and an image processing apparatus to calculate the three-dimensional position of the pallet within the captured image.

CITATION LIST

Patent Literature

Patent Literature 1: Japanese Unexamined Patent Application Publication No. H01-241604

SUMMARY OF INVENTION

Technical Problem

However, a three-dimensional position of a pallet calculated using images may vary in accuracy depending on the quality of the captured images. For instance, images of the pallet captured from a distant location may result in a blurry representation of the pallet. When the pallet appears blurry in the image, it becomes very difficult to accurately calculate its three-dimensional position, leading to difficulties in achieving precise autonomous traveling of an unmanned forklift.

One of the objects of the present disclosure is to provide a vehicle control apparatus, a control method, a program, and a non-transitory computer readable medium storing a program that can accurately control autonomous driving of a vehicle using images.

Solution to Problem

A vehicle control apparatus according to a first example aspect of the present disclosure includes: a camera image acquisition unit configured to acquire an image from a camera included in a forklift; an image recognition unit configured to recognize a pallet and an insertion opening provided in the pallet from the acquired image; and a movement control unit configured to determine a direction in which the forklift is present with respect to the insertion opening according to a relative size of the insertion opening relative to a size of the pallet in the image and control movement of the forklift so as to move a fork of the forklift to a position where the fork of the forklift can be inserted into the insertion opening.

A vehicle control method according to a second example aspect of the present disclosure includes: acquiring an image from a camera included in a forklift; recognizing a pallet and an insertion opening provided in the pallet from the acquired image; determining a direction in which the forklift is present with respect to the insertion opening according to a relative size of the insertion opening relative to a size of the pallet in the image; and controlling movement of the forklift so as to move a fork of the forklift to a position where the fork of the forklift can be inserted into the insertion opening.

A program according to a third example aspect of the present disclosure causes a computer to execute: acquiring an image from a camera included in a forklift; recognizing a pallet and an insertion opening provided in the pallet from the acquired image; determining a direction in which the forklift is present with respect to the insertion opening according to a relative size of the insertion opening relative to a size of the pallet in the image; and controlling movement of the forklift so as to move a fork of the forklift to a position where the fork of the forklift can be inserted into the insertion opening.

Advantageous Effects of Invention

According to the present disclosure, it is possible to provide a vehicle control apparatus, a control method, a program, and a non-transitory computer readable medium storing a program that can accurately control autonomous driving of a vehicle using images.

EXAMPLE EMBODIMENT

First Example Embodiment

Figure 1:
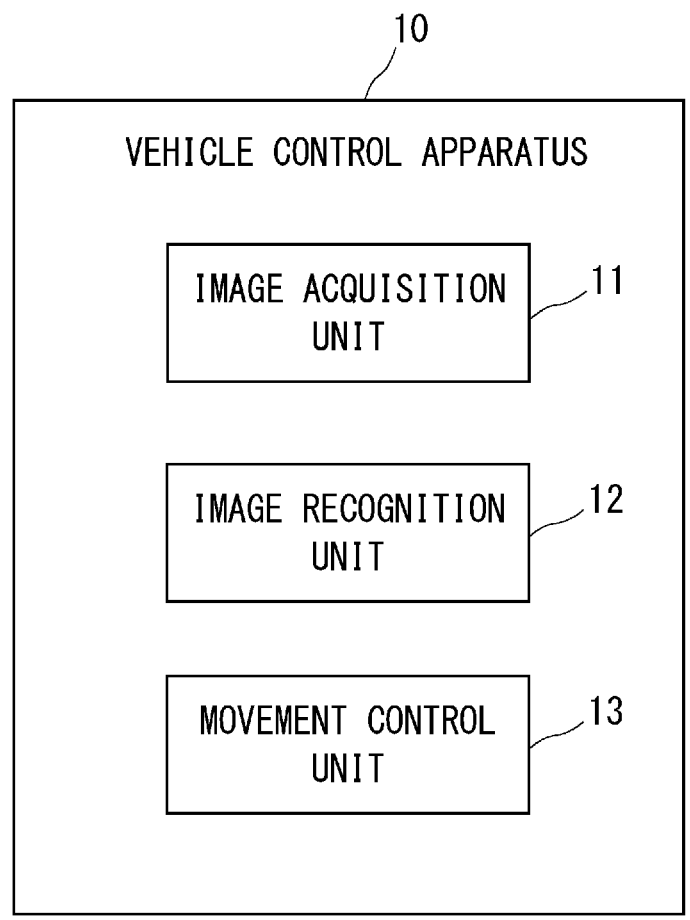
FIG. 1 is a configuration diagram of a vehicle control apparatus according to a first example embodiment.

Hereinafter, example embodiments of the present disclosure will be described with reference to the drawings. First, a configuration example of a vehicle control apparatus 10 according to a first example embodiment will be described with reference to FIG. 1. The vehicle control apparatus 10 may be software or modules operated by a processor executing a program stored in a memory. The vehicle control apparatus 10 may be mounted on a vehicle to be controlled or may not be physically mounted on the vehicle but instead transmit control commands to the vehicle to be controlled via a network.

The vehicle control apparatus 10 includes an image acquisition unit 11, an image recognition unit 12, and a movement control unit 13. The image acquisition unit 11, the image recognition unit 12, and the movement control unit 13 may be software or modules whose processing is executed by the processor executing a program stored in the memory. Alternatively, the image acquisition unit 11, the image recognition unit 12, and the movement control unit 13 may be hardware such as circuits or chips.

The image acquisition unit 11 acquires images from a camera included in a forklift. The forklift is a vehicle to be controlled by the vehicle control apparatus 10. The forklift travels autonomously in accordance with the control provided by the vehicle control apparatus 10. The camera captures images of the surroundings of the forklift to generate images. The image may be referred to as image data. For example, the camera may be positioned where it is possible to capture images of an object present in a direction in which the forklift travels. The forklift inserts its forks into insertion openings of the pallet to transport cargo.

The image acquisition unit 11 may acquire an image from the camera at any time or periodically. The image may be, for example, an RGB (Red Green Blue) image or an RGB-D (RGB and Depth) image. The RGB image is a color image. The RGB image is generated, for example, in an RGB camera. The RGB-D image is an image including an RGB image which is a color image and a depth image. The RGB-D image may be generated, for example, in an RGB-D camera. An RGB-D camera is a device including a distance sensor that detects a distance from the camera to the object.

The image recognition unit 12 recognizes the pallet and insertion openings provided in the pallet from the captured images. The forklift moves toward the position of the pallet. Therefore, the image captured by the camera included in the forklift includes the pallet and the insertion openings provided in the pallet. The image recognition unit 12 may, for example, extract the feature amounts of the pallet and the insertion openings to recognize the pallet and the insertion openings based on the feature values. The image recognition unit 12 may, for example, recognize the pallet and the insertion openings included in the image using a learning model for recognizing the pallet and the insertion openings obtained by executing machine learning or deep learning.

The movement control unit 13 determines a direction in which the forklift is present relative to the position of the insertion openings based on the relative size of the insertion openings to the size of the palette in the image. Further, when the movement control unit 13 determines the direction in which the forklift is present, it controls the movement of the forklift so as to move the forks of the forklift to a position where they can be inserted into the insertion openings.

For example, the movement control unit 13 may determine that the forklift is present at a position closer to the front direction of the insertion openings as the relative size of the insertion openings relative to the size of the pallet increases. Additionally, the movement control unit 13 may determine that the forklift is present in a position offset from the front direction of the insertion opening as the relative size of the insertion opening decreases relative to the size of the pallet.

Each of the forks of the forklift has a rod-like or plate-like shape extending horizontally from the ground and may be installed in the front direction of the forklift. The front direction of the forklift may be, for example, the traveling direction of the forklift. In addition, each of the insertion openings of the pallet has a space in the pallet longer than or equal to the fork so that the fork can be inserted. Therefore, the position where the forks can be inserted into the insertion openings may be, for example, a position where the forklift is directly opposed to the insertion openings.

As described above, the vehicle control apparatus 10 uses the relative size of the insertion openings relative to the size of the pallet included in the image to determine the direction in which the forklift is present relative to the insertion openings. Thus, the vehicle control apparatus 10 can determine the direction in which the forklift is present without using three-dimensional positions of the pallet and the insertion openings, which would vary the estimation accuracy depending on the image quality, etc. Instead, it relies on the size of the two-dimensional objects included in the image, such as the pallet and insertion openings, to determine the direction in which the forklift is present. As a result, the vehicle control apparatus 10 can stabilize the accuracy of determining the direction in which the forklift is present, and can accurately control the autonomous driving of the forklift.

Second Example Embodiment

Figure 2:
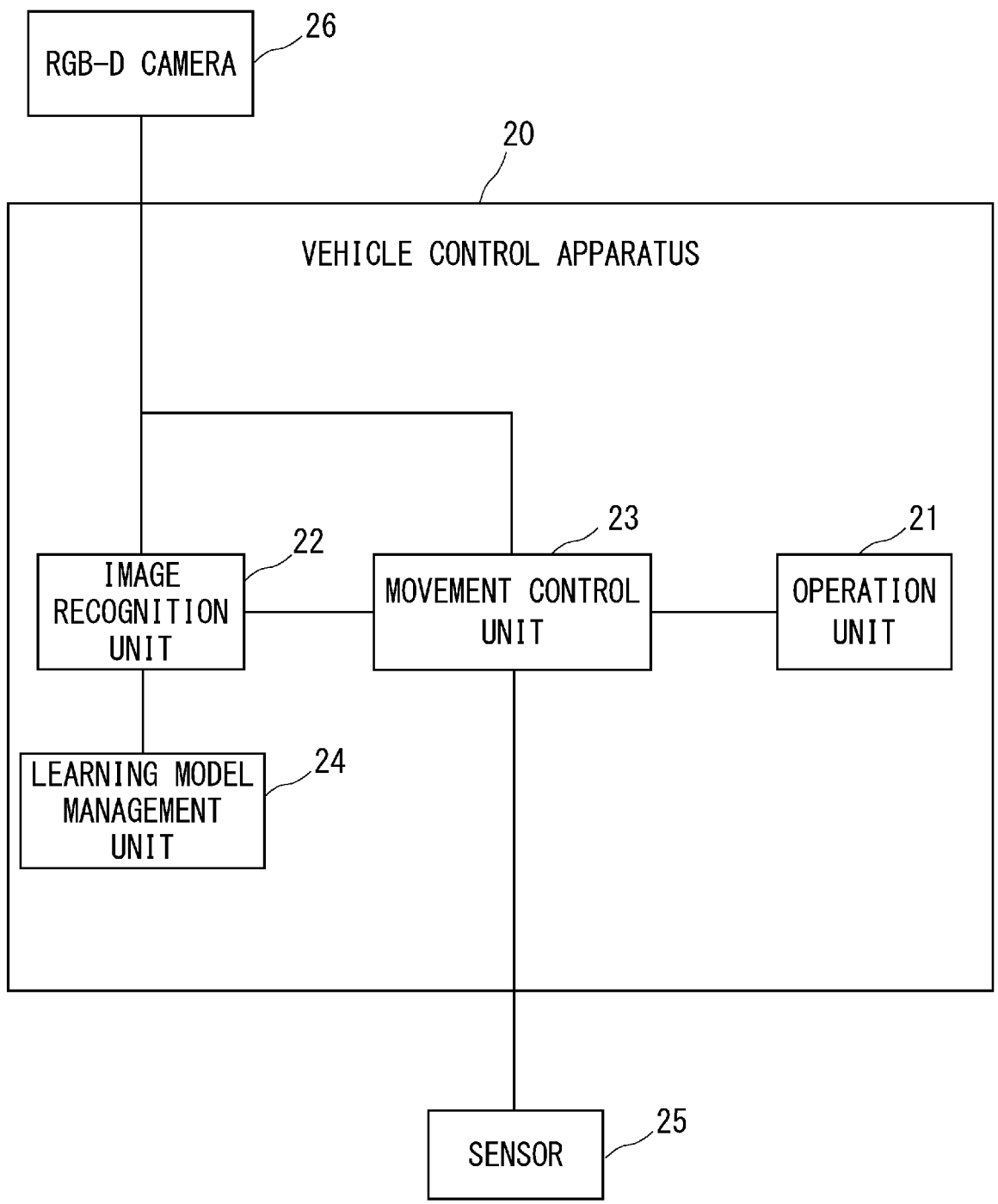
FIG. 2 is a configuration diagram of a vehicle control apparatus according to a second example embodiment.

Next, a configuration example of a vehicle control apparatus 20 according to a second example embodiment will be described with reference to FIG. 2. The vehicle control apparatus 20 corresponds to the vehicle control apparatus 10 shown in FIG. 1. The vehicle control apparatus 20 is mounted on a forklift and controls movements of the forklift.

The vehicle control apparatus 20 includes an operation unit 21, an image recognition unit 22, a movement control unit 23, and a learning model management unit 24. The operation unit 21, the image recognition unit 22, the movement control unit 23, and the learning model management unit 24 may be software or modules whose processing is executed by the processor executing a program stored in the memory. Alternatively, the operation unit 21, the image recognition unit 22, the movement control unit 23, and the learning model management unit 24 may be hardware such as a circuit or a chip. A sensor 25 and an RGB-D camera 26 may be mounted inside the vehicle control apparatus 20 and may be connected to the vehicle control apparatus 20 via a cable or wireless communication line.

The RGB-D camera 26 may, for example, capture scenery or objects present in the traveling direction of the forklift. In addition to the RGB image, the RGB-D camera 26 also generates a depth image indicating a distance to the object.

The RGB-D camera 26 outputs the generated RGB image to the image recognition unit 22 and outputs the depth image to the movement control unit 23.

The learning model management unit 24 manages a learning model having trained on shapes of a pallet and fork pockets provided in the pallet. The fork pockets correspond to the insertion openings provided in the pallet. The learning model may be created, for example, by performing deep learning. Specifically, a Convolutional Neural Network (CNN) may be used to create the learning model. The learning model may be created using a computer apparatus different from the vehicle control apparatus 20 or it may be created in the vehicle control apparatus 20. For example, before the vehicle control apparatus 20 is mounted on the forklift, the learning model may be created by learning various pallet and fork pocket shapes in a computer apparatus different from the vehicle control apparatus 20. Furthermore, in an environment where cargos are transported using the forklift, the vehicle control apparatus 20 may further learn the pallet and fork pocket shapes actually used using a pre-generated learning model to improve pallet and fork pocket recognition accuracy. That is, the vehicle control apparatus 20 may update the pre-generated learning model to be applied to an environment where the forklift actually travels.

The image recognition unit 22 recognizes the pallet and fork pockets included in the image received from the RGB-D camera 26 using the learning model managed by the learning model management unit 24. The image recognition unit 22 recognizes the pallet and the fork pockets, for example, by indicating the region including the pallet and the region including the fork pockets with rectangles.

Figure 3:
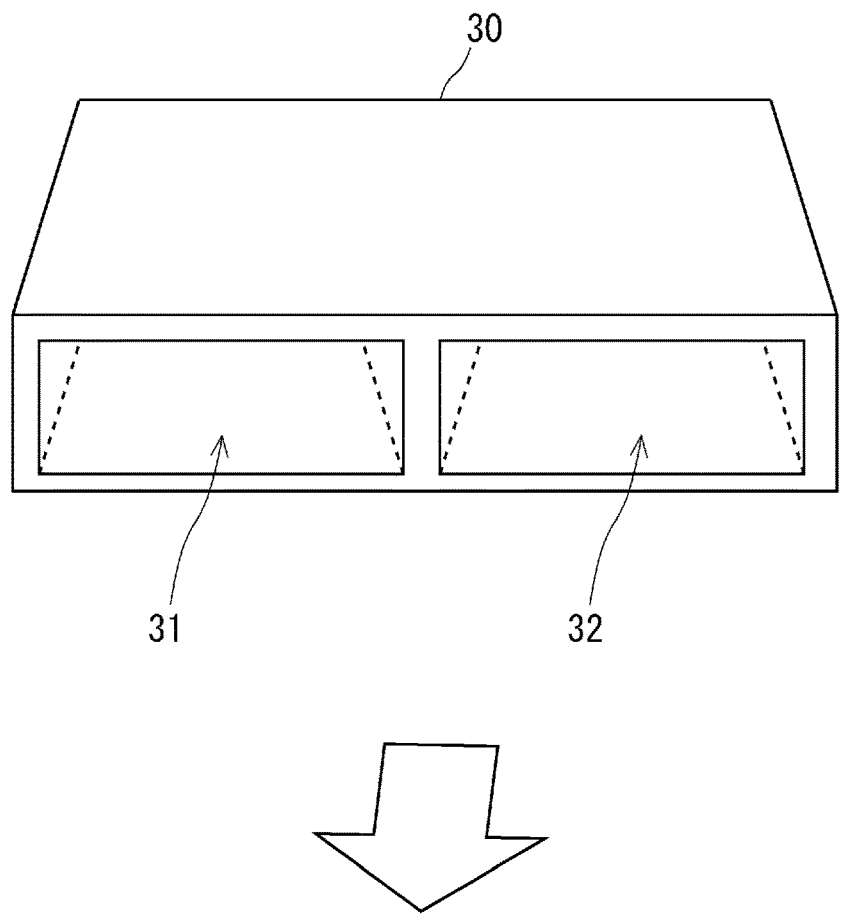
FIG. 3 is a diagram for explaining a pallet and fork pockets recognized by an image recognition unit according to the second example embodiment.
Figure 3:
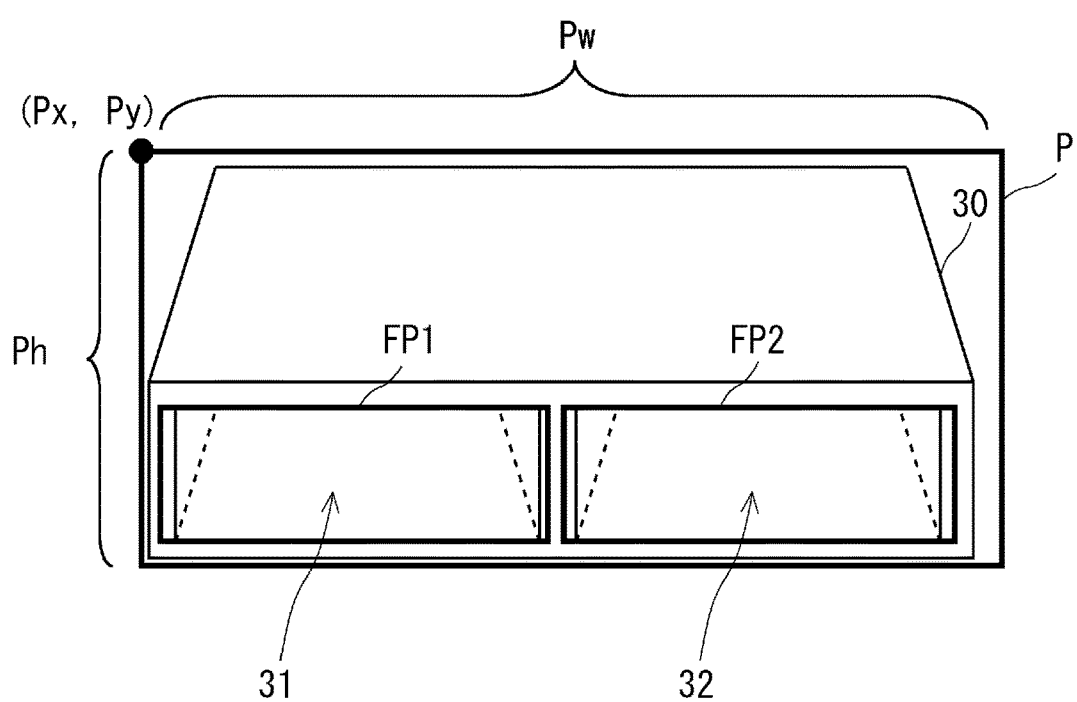

The pallet and the fork pockets recognized by the image recognition unit 22 will now be described with reference to FIG. 3. The upper drawing of FIG. 3 shows a pallet 30, a fork pocket 31, and a fork pocket 32. FIG. 3 shows a configuration example in which the pallet 30 includes two fork pockets, but the number of fork pockets is not limited to two. The fork pockets form spaces within the pallet 30 where forks are inserted.

The image recognition unit 22 receives an image including the pallet 30, the fork pocket 31, and the fork pocket 32 shown in the upper drawing of FIG. 3 from the RGB-D camera 26. The image shown in the upper drawing of FIG. 3 shows the pallet 30, the fork pocket 31, and the fork pocket 32 included in the image captured from the front direction of the fork pockets 31 and 32.

In the image received from the RGB-D camera 26, the image recognition unit 22 recognizes the region including the pallet 30, the fork pocket 31, and the fork pocket 32 as a rectangle using the learning model, as shown in the lower drawing of FIG. 3. That is, the pallet 30 is recognized as a rectangle P. The fork pocket 31 is recognized as a rectangle FP1. The fork pocket 32 is recognized as a rectangle FP2. Furthermore, the image recognition unit 22 identifies the coordinates (coordinate values) inside at least one of partial images for each of the four vertices of these rectangles, the height of the rectangle, and the width of the rectangle for each rectangle in the image. More specifically, the positions in the image received from the RGB-D camera 26 are indicated in a two-dimensional coordinate (x-y coordinate) system corresponding to the image. For example, for the rectangle P representing the palette 30, the coordinates of the top left vertex (Px, Py), the height Ph of the rectangle P, and the width Pw of the rectangle P are identified. Similarly, for the fork pocket 31, the coordinates of the top left vertex (FP1x, FP1y), the height FP1h, and the width FP1w are identified. Similarly, for the fork pocket 32, the coordinates of the top left vertex (FP2x, FP2y), the height FP2h, and the width FP2w are identified.

Returning to FIG. 2, the image recognition unit 22 outputs the information identified for the pallet 30, the fork pocket 31, and the fork pocket 32 to the movement control unit 23.

The movement control unit 23 uses the information received from the image recognition unit 22 to determine the direction in which the forklift is present relative to the positions of the fork pockets 31 and 32. The positions of the fork pockets 31 and 32 may be relative to, for example, the center of the surface including the fork pockets 31 and 32.

Specifically, the movement control unit 23 may determine the direction in which the forklift is present depending on whether Expression 1 below is satisfied.

$$Pw - (FP1w + FP2w) < A \qquad \text{(Expression 1)}$$

A is a positive real number and is used as a threshold. If Pw, FP1w, and FP2w satisfy Expression 1, the movement control unit 23 determines that the forklift is present in the front direction of the fork pockets 31 and 32. Further, if Pw, FP1w, and FP2w do not satisfy Expression 1, the movement control unit 23 determines that the forklift is positioned offset from the front direction of the fork pockets 31 and 32. A position offset from the front direction of the fork pockets 31 and 32 may be referred to as a position in the oblique direction when the fork pockets 31 and 32 of the pallet 30 are in front.

FIG. 3 shows the pallet 30 included in an image in which the forklift is captured from the front direction of the fork pockets 31 and 32. When the pallet 30 is captured from the front direction of the fork pockets 31 and 32, a difference between the width Pw of the pallet 30 and the width FP1w+FP2w of the fork pockets 31 and 32 is smaller than A. In other words, the relative size of the width FP1w+FP2w of the fork pockets 31 and 32 compared to the width Pw of the pallet 30 can be considered large.

Figure 4:
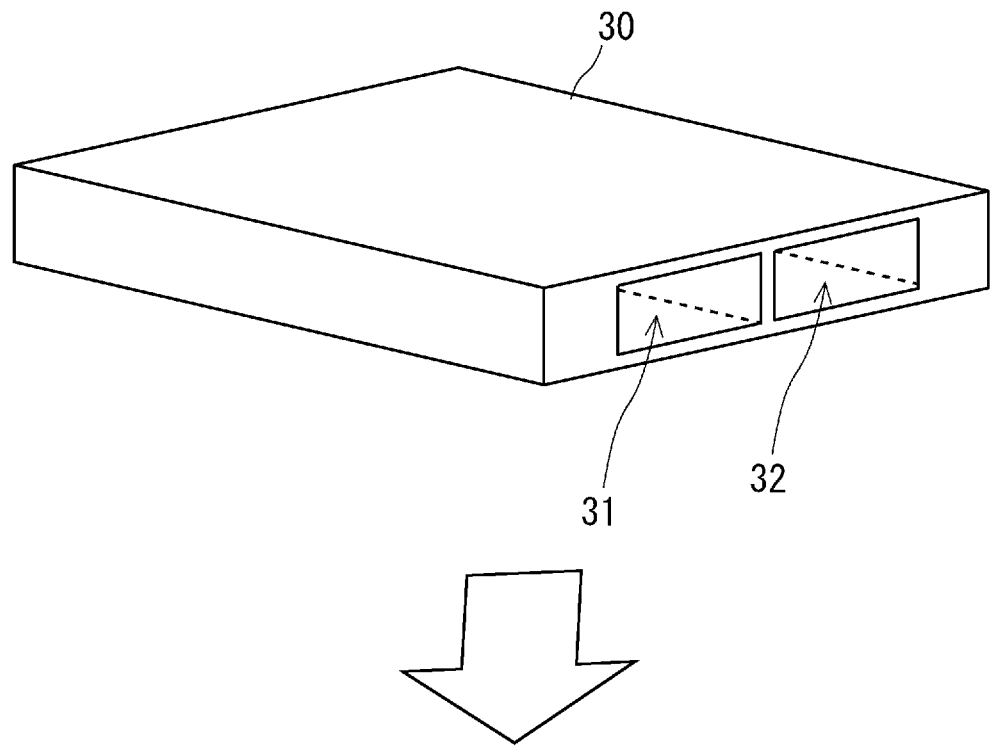
FIG. 4 is a diagram for explaining the pallet and the fork pockets recognized by the image recognition unit according to the second example embodiment.
Figure 4:
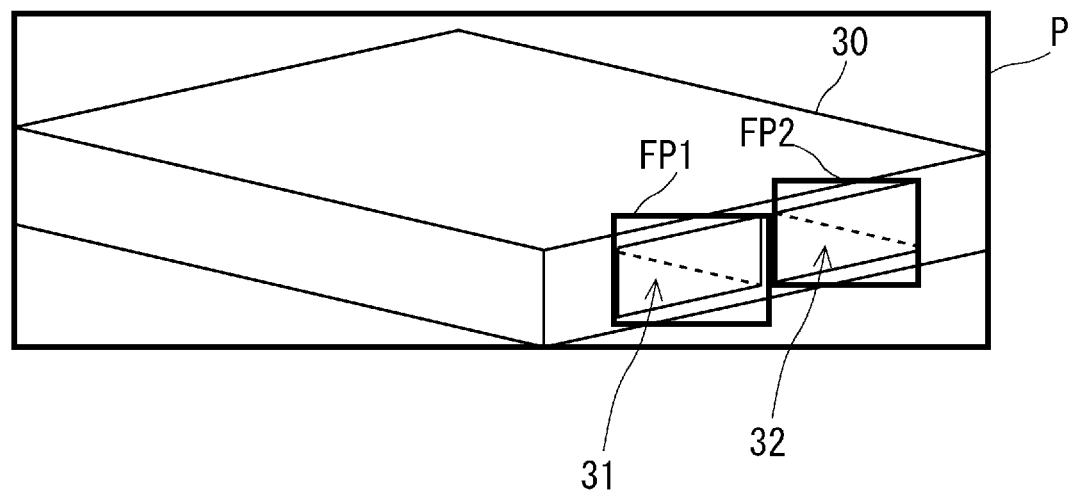

On the other hand, FIG. 4 shows the pallet 30 included in an image in which the forklift is captured from the oblique direction of the pallet 30. When the fork pockets 31 and 32 are captured from the oblique direction of the pallet 30, the difference between the width Pw of the pallet 30 and the width FP1w+FP2w of the fork pockets 31 and 32 increases compared to when they are captured from the front direction. That is, the difference between the width Pw of the pallet 30 and the width FP1w+FP2w of the fork pockets 31 and 32 is larger than A. In other words, the relative size of the width FP1w+FP2w of the fork pockets 31 and 32 compared to the width Pw of the pallet 30 can be considered small.

The movement control unit 23 may determine the direction in which the forklift is present depending on whether or not the following Expression 2 is satisfied instead of Expression 1.

$$Pw < B(FP1w + FP2w) \qquad \text{(Expression 2)}$$

B is a real number greater than or equal to 1.

If Pw, FP1w, and FP2w satisfy Expression 2, the movement control unit 23 may determine that the forklift is present in the front direction of the fork pocket 31 and the fork pocket 32. On the other hand, if Pw, FP1w, and FP2w do not satisfy Expression 2, the movement control unit 23 may determine that the forklift is positioned offset from the front direction of the fork pockets 31 and 32.

When the movement control unit 23 determines the direction in which the forklift is present, it generates a control command for the forklift. This section mainly describes the control command executed via the operation unit 21 for a travel control lever and a steering included in the forklift. The travel control lever is operated to move the forklift forward or backward. The steering is operated to turn the forklift.

Figures 5, 6:
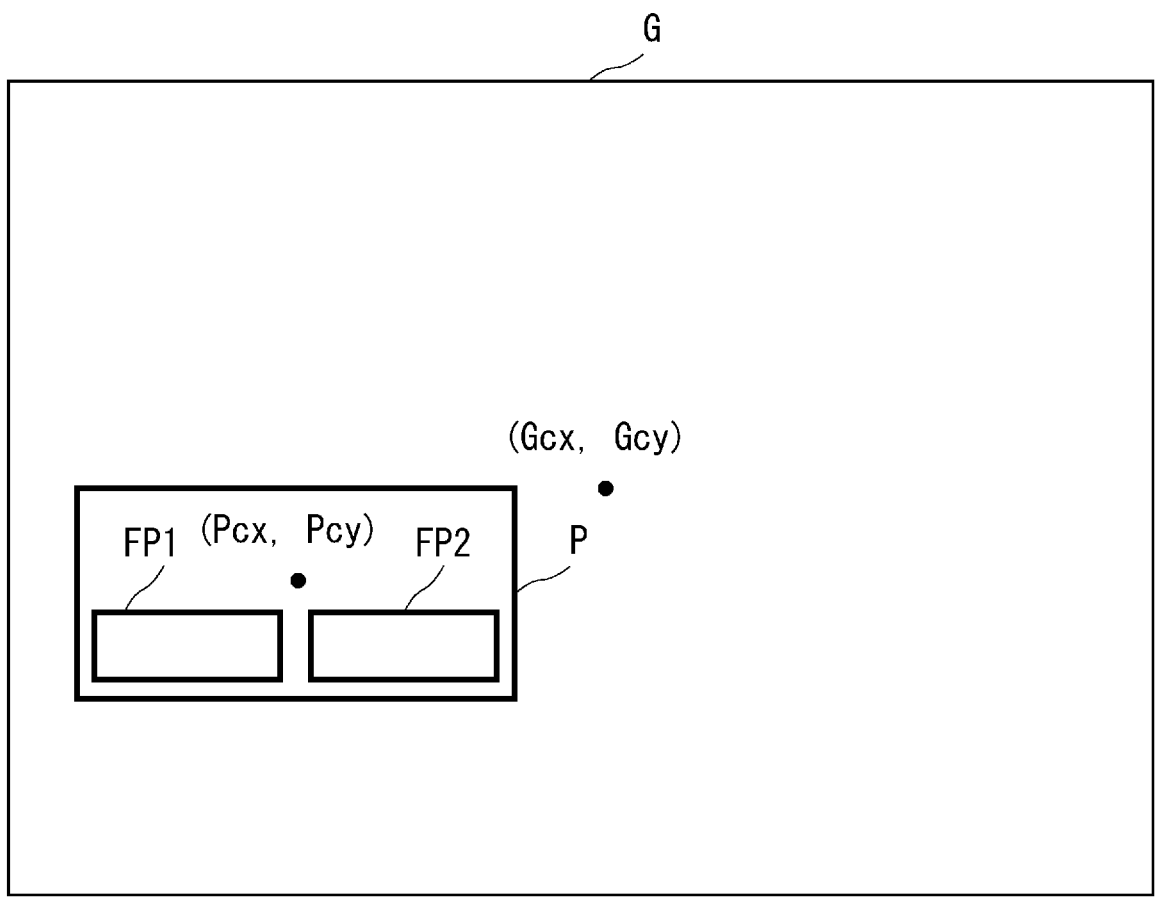
FIG. 5 is a diagram for explaining a control command of a travel control lever and a steering according to the second example embodiment.
FIG. 6 is a diagram for explaining a control command when the forklift according to the second example embodiment is present in a front direction of the fork pockets.

For example, as shown in FIG. 5, the control command for the travel control lever and the steering may specify a numerical value. For example, the control command for the travel control lever may be indicated by a numerical value between −400 and +450. If a positive value is specified as the control command for the travel control lever, the forklift moves forward, whereas if a negative value is specified, the forklift moves backward. The larger an absolute value of the positive value and the negative value, the faster the forklift moves, whereas the smaller the absolute value, the slower the forklift moves.

Also, for example, the control command for the steering is indicated by a numerical value between −8,800 and +8,800. If a positive value is specified as the control command for the steering, the forklift turns right, whereas if a negative value is specified, the forklift turns left. The larger the absolute value of the positive value and the negative value, the larger the turning angle or the rotation angle of the forklift, whereas the smaller the absolute value, the smaller the turning angle or the rotation angle.

Here, the control command when the forklift is present in the front direction of the fork pockets 31 and 32 will be described with reference to FIG. 6.

G in FIG. 6 indicates an RGB image captured by the RGB-D camera 26. FIG. 6 shows a rectangle P of the palette 30, the fork pocket 31, and the fork pocket 32 recognized by the image recognition unit 22 in the RGB image. The coordinates (Gcx, Gcy) indicate the center coordinates in the RGB image G. The coordinates (Pcx, Pcy) indicate the center coordinates of the rectangle P of the palette 30. For example, the x-coordinate Pcx is obtained as Px+Pw×½. "/" indicates division. Px is the x-coordinate of the top left vertex of the rectangle of the palette 30, and Pw is the width of the rectangle of the palette 30.

The movement control unit 23 controls the steering and the travel control levers so that the x-coordinate of the center coordinate of the palette 30 approaches the x-coordinate of the center coordinate of the image G. Specifically, the movement control unit 23 generates a control command using a hyperbolic function tan h so that the x-coordinate Pcx becomes the x-coordinate Gcx. Specifically, the movement control unit 23 determines a control command S for the steering using the following Expression 3.

$$S = S\max \times \tanh(Pcx - Gcx) \quad \text{(Expression 3)}$$

S max is a steering maximum value.

Expression 3 shows that as the x-coordinate of the center coordinate of the palette 30 and the x-coordinate of the center coordinate of the image G move apart, the turning angle increases.

Furthermore, the movement control unit 23 applies a distance D from the forklift to the fork pockets 31 and 32 to Expression 4 below to determine a control command C for the travel control lever. The distance D is defined in the depth image output from the RGB-D camera 26 to the movement control unit 23.

$$C = C\min(C\max \times D < C\min) \text{ or } C = C\max \times D(\text{otherwise}) \quad \text{(Expression 4)}$$

C min is a minimum value of the travel control lever.
C max is a maximum value of the travel control lever.
D is a real number between 0 and 1. For example, 100 meters may be D=0.1 (kilometers).

Expression 4 indicates that the forklift slows down as it approaches the fork pockets 31 and 32, and speeds up as it moves offset from the fork pockets 31 and 32.

Figure 7:
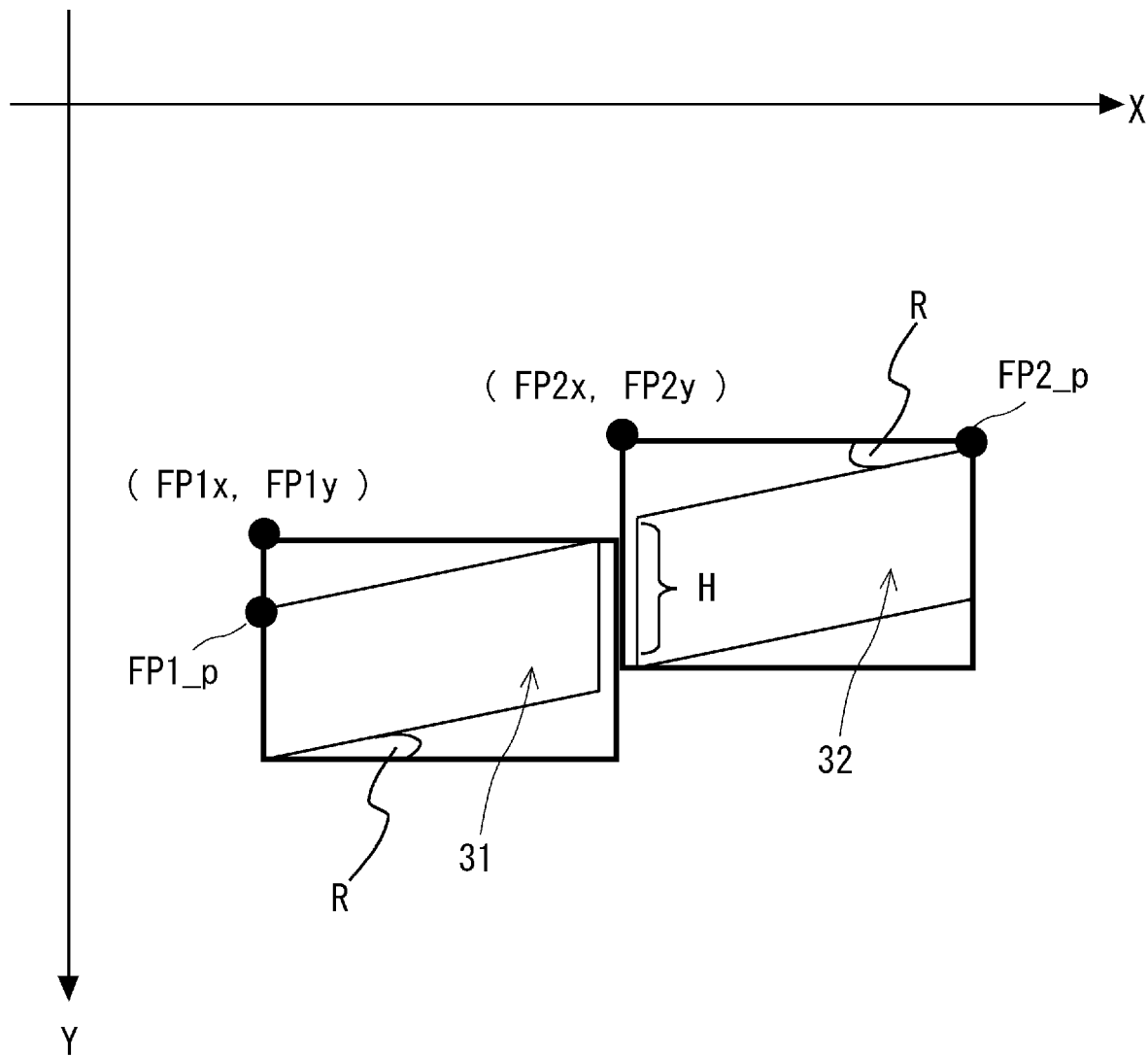
FIG. 7 is a diagram for explaining the control command when the forklift according to the second example embodiment is present in an oblique direction of the fork pockets.

Next, control commands when the forklift is present in the oblique direction of the fork pockets 31 and 32 will be described with reference to FIGS. 7 and 8. FIG. 7 shows rectangles FP1 and FP2 and the fork pocket 31 and fork pocket 32 included in the rectangles as regions on the XY plane.

The coordinates (FP1x, FP1y) and (FP2x, FP2y) are values identified in the image recognition unit 22. FP1_p indicates the top left vertex of the fork pocket 31. The coordinates of FP1_p are FP1_p (FP1_px, FP1_py). FP2_p indicates the top right vertex of the fork pocket 32. The coordinates of FP2_p are FP2_p (FP2_px, FP2_py). H indicates the height of the fork pockets 31 and 32. An angle R indicates an inclination of the pallet 30. The inclination of the pallet 30 indicates a deviation of the direction in which the forklift is present from the front direction of the fork pockets 31 and 32. When the pallet 30 is captured from the front direction of the fork pockets 31 and 32, the bottom of the fork pockets 31 and 32 is shown in the image as a straight line extending substantially horizontally. On the other hand, when the pallet 30 is captured from the oblique direction of the fork pockets 31 and 32, the bottom of the fork pockets 31 and 32 is shown in the image as a straight line inclined horizontally. As the angle R increases, the deviation of the direction in which the forklift is present from the front direction of the fork pockets 31 and 32 increases.

First, the movement control unit 23 estimates the angle R. Here, it is assumed that the distance between the rectangle FP1 and the rectangle FP2 is substantially 0 and that the rectangle FP1 and the rectangle FP2 are in contact with each other as shown in FIG. 7. In this case, tan R is calculated as Expression 5 below.

$$\tan R = (FP1\_py - FP2\_py)/(FP2\_px - FP1\_px) \quad \text{(Expression 5)}$$

$$FP1\_px = FP1x$$

$$FP1\_py = FP1y + FP1h - H$$

$$FP2\_px = FP2x + FP2w$$

$$FP2\_py = FP2y$$

$$H = FP2y + FP2h - FP1y$$

When calculating H, the y-coordinate of the top left vertex of the fork pocket 32 is assumed to be the same as that of FP1y.

That is, tan R can be indicated using the information identified in the image recognition unit 22. Further, R can be calculated as R=arctan R(FP1_py−FP2_py)/(FP2_px−FP1_px).

Figure 8:
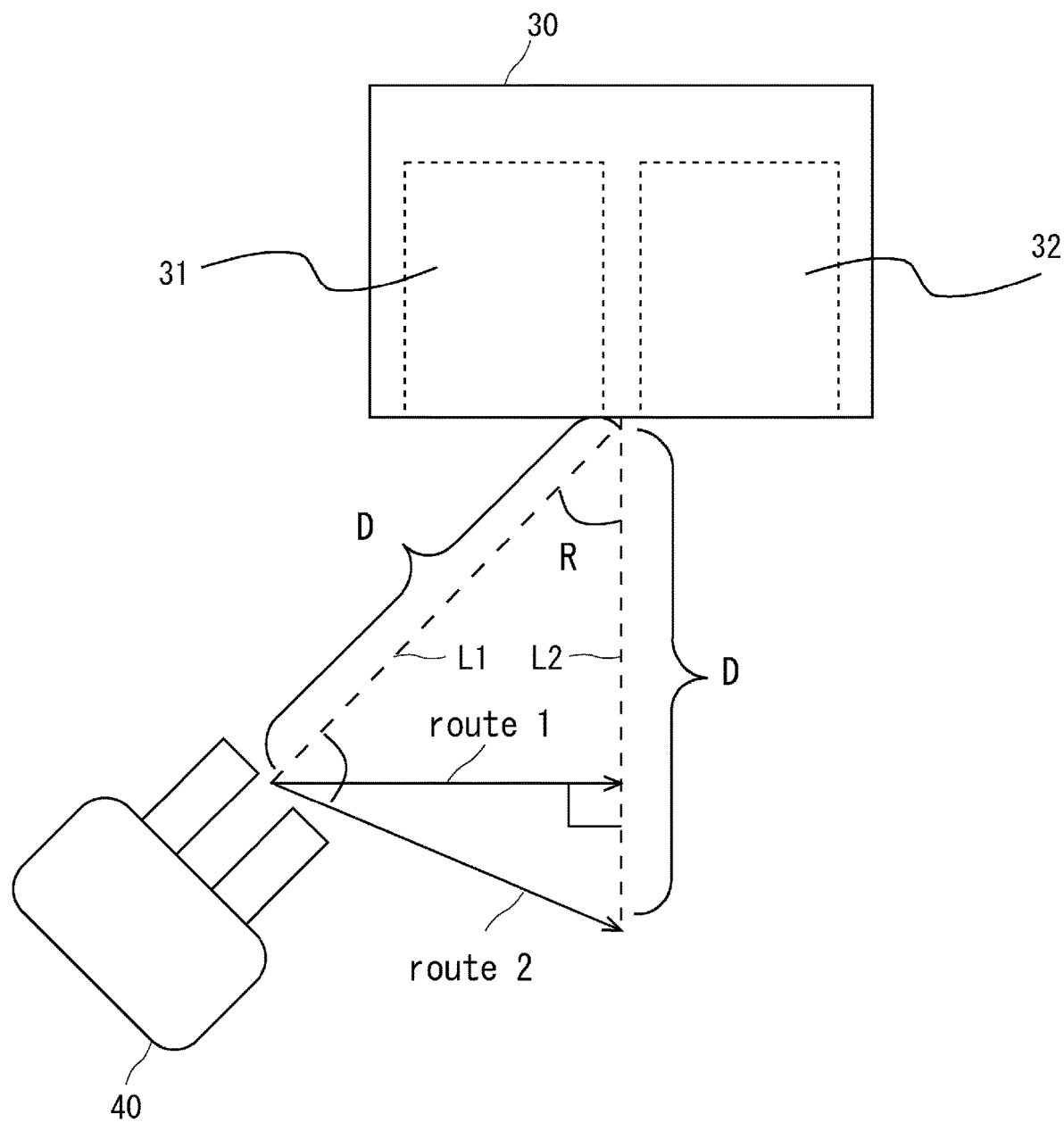
FIG. 8 is a diagram for explaining the control command when the forklift according to the second example embodiment is present in the oblique direction of the fork pockets.

FIG. 8 shows the position of the pallet 30 and the forklift 40 when viewed from above. The fork pockets 31 and 32 are provided inside the pallet 30 and are indicated by dotted lines. A dotted line L1 indicates the distance D between the forklift 40 and the fork pockets 31 and 32. A dotted line L2 indicates a virtual line extending in the front direction of the fork pockets 31 and 32. The angle R in FIG. 8 indicates an angle of the direction in which the forklift 40 is present with reference to the front direction of the fork pockets 31 and 32. The angle R indicates a deviation of the direction in which the forklift is present from the front direction of the fork pockets 31 and 32, and corresponds to the angle R shown in FIG. 7.

The movement control unit 23 selects either a route 1 or a route 2 shown in FIG. 8, depending on whether D cos R exceeds a threshold. If D cos R exceeds the threshold, this indicates that the position of the forklift 40 is sufficiently far away from the pallet 30. Therefore, the movement control unit 23 selects the route 1 to move the forklift 40 the maximum distance toward the front of the fork pockets 31 and 32. For example, the movement control unit 23 rotates the forklift 40 by (90−R) degrees to move it by D sin R. When the forklift 40 reaches the virtual line extending in the front direction of the fork pockets 31 and 32 on the route 1, the position of the forklift is sufficiently at a position far away from the pallet 30 so that the forks can be turned to face the pallet 30 in situ.

On the other hand, when the D cos R falls below the threshold, it indicates that the forklift 40 is positioned close to the pallet 30. In such a case, when the forklift 40 moves along the route 1, the forks may collide with the pallet 30 when the forklift 40 performs a turning operation on the virtual line extending in the front direction of the fork pockets 31 and 32. In this case, the forklift 40 cannot insert the forks into the fork pockets 31 and 32. Therefore, the movement control unit 23 selects the route 2. For example, the movement control unit 23 rotates the forklift 40 by (90−R/2) degrees and moves it by 2D cos(90−R/2). When the forklift 40 reaches a virtual line on the route 2, the position it reaches is farther away from the pallet 30 than the position along the virtual line that would be reached in the route 1. For example, when the forklift 40 reaches the virtual line along the route 2, its position may be at a distance D away from the fork pockets 31 and 32. In other words, the route 2 is a route that allows the forklift 40 to move toward the front direction of the fork pockets 31 and 32 in a more circumventing manner compared to the route 1.

In addition, if D cos R falls below the threshold, the angle at which the forklift 40 rotates is not limited to (90−R/2) degrees. For instance, it may be a larger angle, such as greater than (90−R) degrees.

When the forklift 40 reaches the virtual line on the route 1 or the route 2 and captures the image of the pallet 30, it will satisfy either Expression 1 or Expression 2. In other words, the forklift 40 moves from a position where Expression 1 or Expression 2 is satisfied to a position where either Expression 1 or Expression 2 is satisfied and then proceeds to move to a position where it can insert the forks.

The movement control unit 23 may control an amount of rotation and a moving distance using sensor information received from the sensor 25. The sensor 25 measures a gear rotation amount and the like of the forklift 40 as the sensor information. The sensor 25 outputs the measured sensor information to the movement control unit 23. The movement control unit 23 converts the sensor information into a wheel rotation amount, a steering rotation amount, and the like, and controls the rotation amount and the moving distance of the forklift 40. When the forklift is present in the oblique direction of the fork pockets 31 and 32, the turning operation and the moving operation executed by the movement control unit 23 may be referred to as a turnaround operation.

If the forklift 40 approaches the fork pockets 31 and 32 and, for example, manages to read a specific marker attached to the pallet 30, the movement control unit 23 may choose to stop the forklift 40. The movement control unit 23 reads the specific marker included in an image captured by the RGB-D camera 26. The movement control unit 23 may stop the forklift 40 and insert the forks into the fork pocket 31 and fork pocket 32, respectively. The specific marker may be, for example, a QR (Quick Response) code.

The movement control unit 23 outputs an operation command to the operation unit 21. The operation unit 21 operates the travel control lever and the steering based on the received operation commands.

Figure 9:
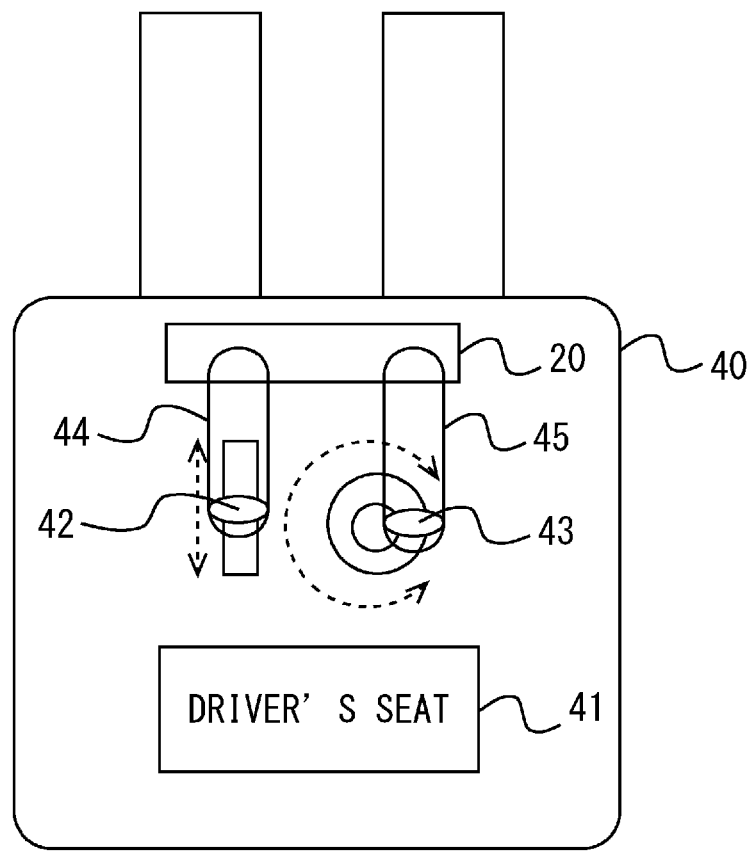
FIG. 9 shows an example of a configuration of the forklift according to the second example embodiment.

The forklift 40 is, for example, a manned forklift, and the travel control lever and the steering are operated according to the operation command of the vehicle control apparatus 20. The forklift 40, as shown in FIG. 9, has a driver's seat 41, a travel control lever 42, a steering 43, and the vehicle control apparatus 20. The forklift 40 can operate with attachments attached to it, which may operate the travel control lever and the steering through the operation commands from the vehicle control apparatus 20. In this case, the attachments may include the vehicle control apparatus 20 and may have a configuration that can be attached to or detached from the forklift 40.

More specifically, as shown in FIG. 9, the forklift 40 is of an operator-controlled type, where the vehicle control apparatus 20 is installed near the driver's seat 41, where the travel control lever 42 and the steering wheel 43 are provided. The vehicle control apparatus 20 has an attachment-based structure that is attachable to and detachable from the forklift 40 and includes a travel control lever drive mechanism 44 and a steering drive mechanism 45, both of which operate according to the operation commands. The vehicle control apparatus 20 operates the travel control lever via the travel control lever drive mechanism 44 and operate the steering via the steering drive mechanism 45. For example, the travel control lever drive mechanism 44 operates the travel control lever 42 in the forward or backward direction of the forklift 40 according to the operation command of the vehicle control apparatus 20. The travel control lever 42 operates in conjunction with the operation of the travel control lever drive mechanism 44. The steering drive mechanism 45 rotates the steering 43 clockwise or counterclockwise according to the operation command of the vehicle control apparatus 20. For example, the steering drive mechanism 45 rotates the steering 43 by combining the forward or backward movement of the forklift 40 and the horizontal movement thereof. The steering 43 operates in conjunction with the operation of the steering drive mechanism 45.

Figure 10:
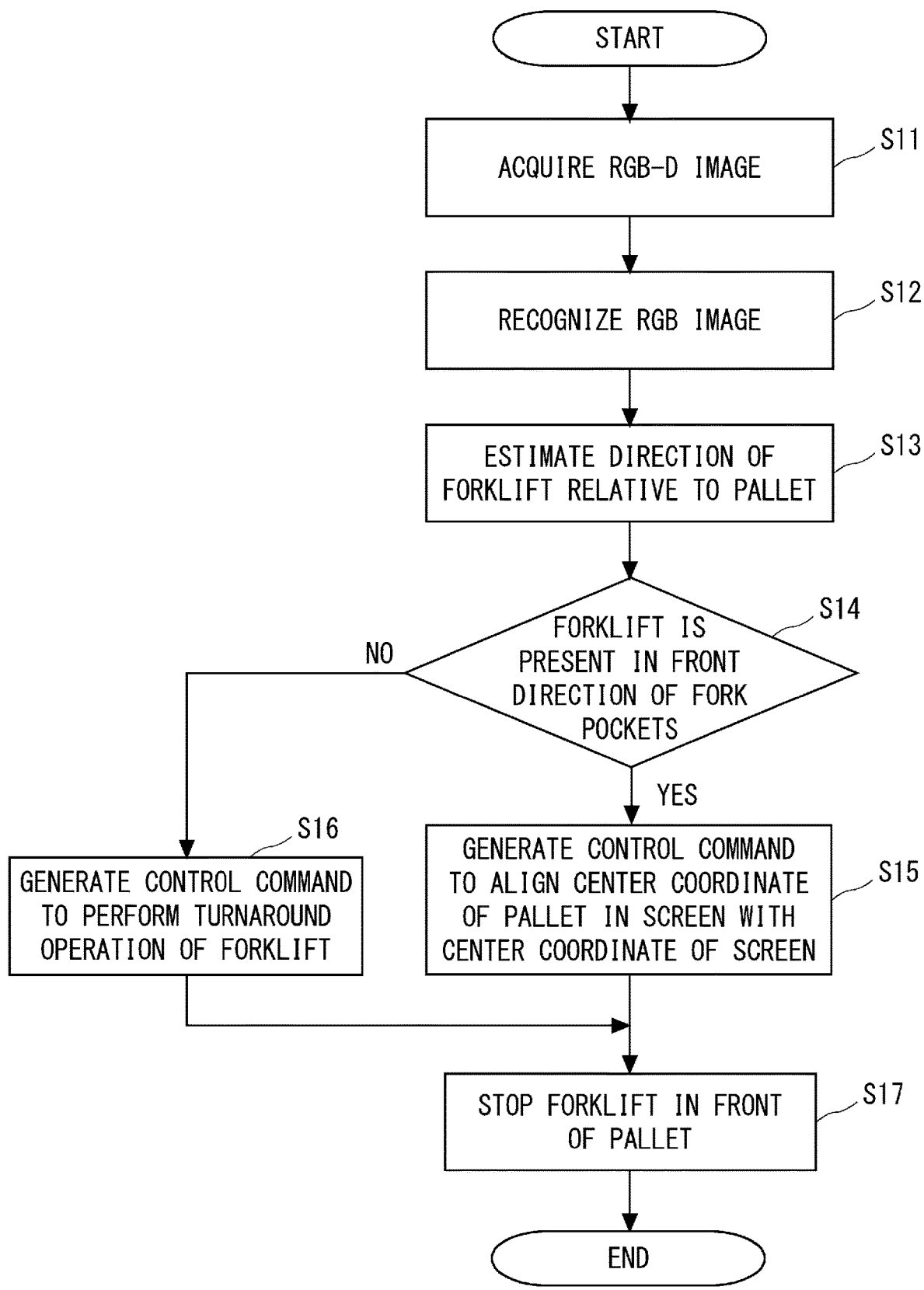
FIG. 10 shows a flow of processing of control the forklift by the vehicle control apparatus according to the second example embodiment.

Next, a flow of processing of controlling the forklift in the vehicle control apparatus 20 according to the second example embodiment will be described with reference to FIG. 10.

First, the RGB-D camera 26 captures the surroundings of the forklift 40 to generate the RGB images and the depth images (S11). Next, the image recognition unit 22 recognizes the pallet 30, the fork pocket 31, and the fork pocket 32 included in the RGB image (S12). Recognizing the pallet 30, the fork pocket 31, and the fork pocket 32 may involve generating rectangles surrounding the regions of the pallet 30, the fork pocket 31, and the fork pocket 32 within the image.

Next, the movement control unit 23 uses a result of the image recognition in the image recognition unit 22 to determine the direction in which the forklift is present relative to the front direction of the fork pockets 31 and 32 (S13).

When the movement control unit 23 determines that the forklift is present in the front direction of the fork pockets 31 and 32, it generates a control command to align the x-coordinate of the center coordinate of the pallet in the image with the x-coordinate of the center coordinate of the image (Step S15). If the movement control unit 23 determines that the forklift is not present in the front direction of the fork pocket 31 and the fork pocket 32, it generates a control command to perform a turnaround operation (Step S16).

Next, the movement control unit 23 stops the forklift when the forklift approaches the pallet 30 and manages to read a specific marker attached to the pallet 30 (S17).

As described above, the vehicle control apparatus 20 according to the second example embodiment can control the autonomous driving of the forklift without using the three-dimensional coordinates of the forklift and the pallet 30. The vehicle control apparatus 20 utilizes the RGB image and depth image generated by the RGB-D camera 26 to achieve autonomous driving control. By avoiding the use of the three-dimensional coordinates that may vary in accuracy depending on the image quality, the vehicle control apparatus 20 can precisely control autonomous driving.

Furthermore, compared to the computations involved in calculating the three-dimensional coordinates of the forklift, the processing of recognizing the pallet 30 and the determination of the position of the forklift within the image have a lower processing load. As a result, the vehicle control apparatus 20 can reduce its processing load compared to executing the computations for the three-dimensional position of the forklift.

Figure 11:
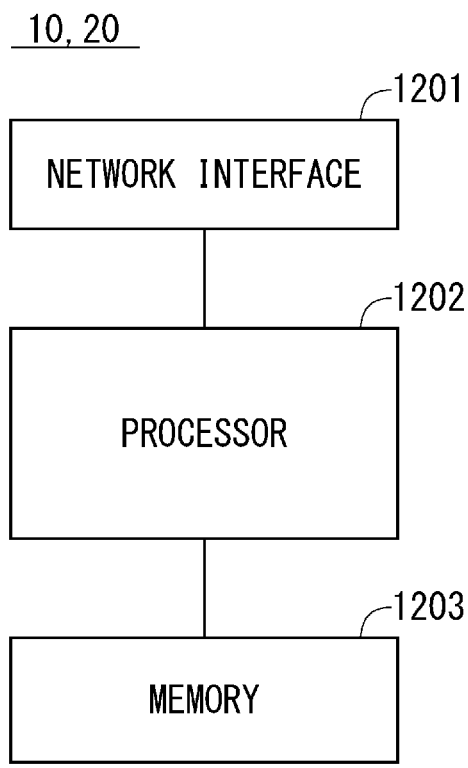
FIG. 11 is a configuration diagram of the vehicle control apparatus according to each of the example embodiments.

FIG. 11 is a block diagram showing an example of a configuration of the vehicle control apparatus 10 and the vehicle control apparatus 20 (hereinafter referred to as the vehicle control apparatus 10 or the like). With reference to FIG. 11, the vehicle control apparatus 10 or the like includes a network interface 1201, a processor 1202, and a memory 1203. The network interface 1201 may be used to communicate with network nodes (e.g., eNB, MME, P-GW). The network interface 1201 may include, for example, a network interface card (NIC) that complies with the IEEE 802.3 series. Here, eNB stands for evolved Node B, MME stands for Mobility Management Entity, and P-GW stands for Packet Data Network Gateway. IEEE stands for Institute of Electrical and Electronics Engineers.

The processor 1202 reads and executes the software (computer program) from the memory 1203 to perform the processing of the vehicle control apparatus 10 or the like described in the above example embodiments. The processor 1202 may be, for example, a microprocessor, an MPU, or a CPU. The processor 1202 may include more than one processor.

The memory 1203 is composed of a combination of volatile and non-volatile memories. The memory 1203 may include a storage that is physically separate from the processor 1202. In this case, the processor 1202 may access the memory 1203 via an I/O (Input/Output) interface (not shown).

In the example of FIG. 11, the memory 1203 is used to store software modules. By reading and executing these groups of software modules from the memory 1203, the processor 1202 can perform operations and processes related to the vehicle control apparatus 10 or the like described in the above example embodiments.

As described with reference to FIG. 11, each of the processors included in the vehicle control apparatus 10 or the like in the above example embodiments executes one or more programs including instructions for causing the computer to perform the operations and processing described in the above example embodiments.

In the above example, the program includes instructions (or software codes) that, when loaded into a computer, cause the computer to perform one or more of the functions described in the embodiments.

The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Note that the present disclosure is not limited to the above-described embodiments and can be subject to appropriate modifications within the scope of the disclosed principles.

The whole or part of the example embodiments disclosed above can be described as, but not limited to, the following supplementary notes.

(Supplementary Note 1)

A vehicle control apparatus comprising:
 a camera image acquisition unit configured to acquire an image from a camera included in a forklift;
 an image recognition unit configured to recognize a pallet and an insertion opening provided in the pallet from the acquired image; and
 a movement control unit configured to determine a direction in which the forklift is present with respect to the insertion opening according to a relative size of the insertion opening relative to a size of the pallet in the image and control movement of the forklift so as to move a fork of the forklift to a position where the fork of the forklift can be inserted into the insertion opening.

(Supplementary Note 2)

The vehicle control apparatus according to supplementary note 1, wherein the image recognition unit generates a first rectangle surrounding the pallet and a second rectangle surrounding the insertion opening using a learning model that has been trained on shapes of the pallet and the insertion opening.

(Supplementary Note 3)

The vehicle control apparatus according to supplementary note 2, wherein the movement control unit determines the direction in which the forklift is present with respect to a position of the insertion opening based on a result of a comparison of a first length of a width of the first rectangle with a second length of a width of the second rectangle.

(Supplementary Note 4)

The vehicle control apparatus according to supplementary note 3, wherein the movement control unit controls the movement of the forklift to bring the first rectangle closer to a center of the image when a difference between the first length and the second length falls below a threshold.

(Supplementary Note 5)

The vehicle control apparatus according to supplementary note 3 or 4, wherein when the difference between the first length and the second length exceeds the threshold, the movement control unit controls the movement of the forklift so that the forklift is moved to a position where the difference between the first length and the second length falls below the threshold.

(Supplementary Note 6)

The vehicle control apparatus according to any one of supplementary notes 1 to 5, wherein the camera image acquisition unit estimates a distance from the forklift to the insertion opening using a camera capable of measuring the distance.

(Supplementary Note 7)

The vehicle control apparatus according to supplementary note 6, wherein the movement control unit controls a speed of the forklift according to the distance from the forklift to the insertion opening.

(Supplementary Note 8)

The vehicle control apparatus according to supplementary note 6 or 7 wherein the movement control unit controls the movement of the forklift based on a value of D cos R, where D (D is a positive real number) is the distance from the forklift to the insertion opening and R is an angle between a direction in which the insertion opening is facing and the direction in which the forklift is present, in such a way that when the value of D cos R exceeds a threshold, the forklift is controlled to move along an extension line in the direction in which the insertion opening is facing in a shortest distance, whereas when the value of D cos R falls below the threshold, the forklift is controlled to move along the extension line in the in which the insertion opening is facing to a position away from the insertion opening by the distance D.

(Supplementary Note 9)

The vehicle control apparatus according to any one of supplementary notes 1 to 8, wherein the image recognition unit uses a learning model trained on the shapes of the pallet and insertion opening to recognize the pallet and the insertion opening.

(Supplementary Note 10)

The vehicle control apparatus according to any one of supplementary notes 1 to 9, wherein the movement control unit controls a control lever to make the forklift move forward or backward and controls the steering to make the forklift turn.

(Supplementary Note 11)

The vehicle control apparatus according to supplementary note 10, further comprising a structure attachable to and detachable from the forklift and is a mechanism capable of operating the control lever and the steering.

(Supplementary Note 12)

A vehicle control method executed by a vehicle control apparatus comprising:
  acquiring an image from a camera included in a forklift;
  recognizing a pallet and an insertion opening provided in the pallet from the acquired image;
  determining a direction in which the forklift is present with respect to the insertion opening according to a relative size of the insertion opening relative to a size of the pallet in the image; and
  controlling movement of the forklift so as to move a fork of the forklift to a position where the fork of the forklift can be inserted into the insertion opening.

(Supplementary Note 13)

A non-transitory computer readable medium storing a program for causing a computer to execute:
  acquiring an image from a camera included in a forklift;
  recognizing a pallet and an insertion opening provided in the pallet from the acquired image;
  determining a direction in which the forklift is present with respect to the insertion opening according to a relative size of the insertion opening relative to a size of the pallet in the image; and
  controlling movement of the forklift so as to move a fork of the forklift to a position where the fork of the forklift can be inserted into the insertion opening.

REFERENCE SIGNS LIST

10 VEHICLE CONTROL APPARATUS
11 IMAGE ACQUISITION UNIT
12 IMAGE RECOGNITION UNIT
13 MOVEMENT CONTROL UNIT
20 VEHICLE CONTROL APPARATUS
21 OPERATION UNIT
22 IMAGE RECOGNITION UNIT
23 MOVEMENT CONTROL UNIT
24 LEARNING MODEL MANAGEMENT UNIT
25 SENSOR
26 RGB-D CAMERA
30 PALLET
31 FORK POCKET
32 FORK POCKET
40 FORKLIFT
41 DRIVER'S SEAT
42 TRAVEL CONTROL LEVER
43 STEERING
44 TRAVEL CONTROL LEVER DRIVE MECHANISM
45 STEERING DRIVE MECHANISM

What is claimed is:

1. A vehicle control apparatus comprising:
   at least one memory storing instructions, and
   at least one processor configured to execute the instructions to;
   acquire an image from a camera included in a forklift;
   recognize a pallet and an insertion opening provided in the pallet from the acquired image;
   determine a direction in which the forklift is present with respect to the insertion opening according to a relative size of the insertion opening relative to a size of the pallet in the image and control movement of the forklift so as to move a fork of the forklift to a position where the fork of the forklift can be inserted into the insertion opening; and
   estimate a distance from the forklift to the insertion opening using a camera capable of measuring the distance; wherein
   the at least one processor is further configured to execute the instructions to control the movement of the forklift based on a value of D cos R, where D (D is a positive real number) is the distance from the forklift to the insertion opening and R is an angle between a direction in which the insertion opening is facing and the direction in which the forklift is present, in such a way that when the value of D cos R exceeds a threshold, the forklift is controlled to move along an extension line in the direction in which the insertion opening is facing in a shortest distance, whereas when the value of D cos R falls below the threshold, the forklift is controlled to move along the extension line in the direction in which the insertion opening is facing to a position away from the insertion opening by the distance D.

2. The vehicle control apparatus according to claim 1, wherein the at least one processor is further configured to execute the instructions to generate a first rectangle surrounding the pallet and a second rectangle surrounding the insertion opening using a learning model that has been trained on shapes of the pallet and the insertion opening.

3. The vehicle control apparatus according to claim 2, wherein the at least one processor is further configured to execute the instructions to determine the direction in which the forklift is present with respect to a position of the insertion opening based on a result of a comparison of a first length of a width of the first rectangle with a second length of a width of the second rectangle.

4. The vehicle control apparatus according to claim 3, wherein the at least one processor is further configured to execute the instructions to control the movement of the forklift to bring the first rectangle closer to a center of the image when a difference between the first length and the second length falls below a threshold.

5. The vehicle control apparatus according to claim 3, wherein when the difference between the first length and the second length exceeds the threshold, the at least one processor is further configured to execute the instructions to control the movement of the forklift so that the forklift is moved to a position where the difference between the first length and the second length falls below the threshold.

6. The vehicle control apparatus according to claim 1, wherein the at least one processor is further configured to execute the instructions to control a speed of the forklift according to the distance from the forklift to the insertion opening.

7. The vehicle control apparatus according to claim 1, wherein the at least one processor is further configured to execute the instructions to use a learning model trained on the shapes of the pallet and insertion opening to recognize the pallet and the insertion opening.

8. The vehicle control apparatus according to claim 1, wherein the at least one processor is further configured to execute the instructions to control a control lever to make the forklift move forward or backward and control the steering to make the forklift turn.

9. The vehicle control apparatus according to claim 8, further comprising a structure attachable to and detachable from the forklift and is a mechanism capable of operating the control lever and the steering.

10. A vehicle control method executed by a vehicle control apparatus comprising:
acquiring an image from a camera included in a forklift;
estimating a distance from the forklift to an insertion opening using a camera capable of measuring the distance;
recognizing a pallet and the insertion opening provided in the pallet from the acquired image;
determining a direction in which the forklift is present with respect to the insertion opening according to a relative size of the insertion opening relative to a size of the pallet in the image; and
controlling movement of the forklift so as to move a fork of the forklift to a position where the fork of the forklift can be inserted into the insertion opening, wherein
the controlling the movement of the forklift comprises controlling the movement of the forklift based on a value of D cos R, where D (D is a positive real number) is the distance from the forklift to the insertion opening and R is an angle between a direction in which the insertion opening is facing and the direction in which the forklift is present, in such a way that when the value of D cos R exceeds a threshold, the forklift is controlled to move along an extension line in the direction in which the insertion opening is facing in a shortest distance, whereas when the value of D cos R falls below the threshold, the forklift is controlled to move along the extension line in the direction in which the insertion opening is facing to a position away from the insertion opening by the distance D.

11. A non-transitory computer readable medium storing a program for causing a computer to execute:
acquiring an image from a camera included in a forklift;
estimating a distance from the forklift to an insertion opening using a camera capable of measuring the distance;
recognizing a pallet and the insertion opening provided in the pallet from the acquired image;
determining a direction in which the forklift is present with respect to the insertion opening according to a relative size of the insertion opening relative to a size of the pallet in the image; and
controlling movement of the forklift so as to move a fork of the forklift to a position where the fork of the forklift can be inserted into the insertion opening, wherein
the controlling the movement of the forklift comprises, controlling the movement of the forklift based on a value of D cos R, where D (D is a positive real number) is the distance from the forklift to the insertion opening and R is an angle between a direction in which the insertion opening is facing and the direction in which the forklift is present, in such a way that when the value of D cos R exceeds a threshold, the forklift is controlled to move along an extension line in the direction in which the insertion opening is facing in a shortest distance, whereas when the value of D cos R falls below the threshold, the forklift is controlled to move along the extension line in the direction in which the insertion opening is facing to a position away from the insertion opening by the distance D.

* * * * *